United States Patent [19]

Mallory

[11] Patent Number: 5,290,639
[45] Date of Patent: Mar. 1, 1994

[54] BATTERY SOCKET FOR SMOKE DETECTOR

[75] Inventor: John Mallory, Mississauga, Canada

[73] Assignee: Disys Corporation, Toronto, Canada

[21] Appl. No.: 893,539

[22] Filed: Jun. 4, 1992

[30] Foreign Application Priority Data

Jan. 28, 1992 [CA] Canada ................................ 2060131-1

[51] Int. Cl.⁵ ............................................... H01M 2/10
[52] U.S. Cl. ............................................ 429/1; 429/96; 429/99; 429/100
[58] Field of Search ....................... 429/1, 96, 99, 100, 429/175, 176; 340/628, 630

[56] References Cited

U.S. PATENT DOCUMENTS

| 4,206,274 | 6/1980 | Peels | 429/100 X |
| 4,371,594 | 2/1983 | Ohara et al. | 429/99 X |
| 4,965,141 | 10/1990 | Suzuki | 429/100 X |

Primary Examiner—John S. Maples
Attorney, Agent, or Firm—Lee, Mann, Smith, McWilliams, Sweeney & Ohlson

[57] ABSTRACT

A battery housing comprising a main body portion, a socket in the main body portion shaped to receive a battery, contacts disposed at one end of the socket adapted to connect with correspondingly disposed electrodes on the battery, and a lid adapted to open and close over the socket, the lid including means for urging the battery electrodes into close connection with the contacts.

13 Claims, 2 Drawing Sheets

BATTERY SOCKET FOR SMOKE DETECTOR

FIELD OF THE INVENTION

The present invention relates in general to battery enclosures, and more particularly to a battery housing or enclosure accommodating a lid for urging the battery into close-fitting connection with corresponding electrodes within the housing.

BACKGROUND OF THE INVENTION

Housings are well known in the field of fire and smoke alarms, burglar alarms etc., for housing electronic circuitry including batteries for providing operating power to such circuitry. For example, one well known ceiling mounted smoke detector incorporates resilient battery clips forming part of a printed circuit board for receiving a nine volt transistor-type battery. The printed circuit board is secured to the ceiling and a plastic enclosure is provided for connection to the printed circuit board forming a protective and decorative cover. In order to install or replace a battery using this prior art arrangement, the user first removes the plastic cover, and then must pry the spent battery loose from the resilient clips. The replacement battery is then installed and the plastic cover replaced thereover.

It has been found that this battery installation or replacement procedure for prior arrangements can often be extremely awkward, and can potentially lead to accidental falls from step ladders, etc. Specifically, since the installation procedure requires the user to simultaneously hold the removed plastic cover and one of either the spent or charged battery while manipulating the other battery relative to the resilient fingers, abundant opportunities are provided for accidental falls. These opportunities are further enhanced in circumstances where the fire alarm has been accidentally activated due to unintentionally generated smoke within the house (e.g. burnt toast, etc.), in which case the user often finds himself or herself frantically attempting to remove the battery from the unit in the midst of a sonic barrage in the form of high volume and high pitch alarm signals.

As an alternative, the user may execute the de-installation or replacement of batteries in multiple steps (e.g. ascending and descending the step ladder three times in succession for removing the plastic cover, replacing or removing the battery, and finally replacing the plastic battery cover). However, human nature being what it is, many user's are apt to forego the cautious and more time consuming procedure in favour of the first discussed quicker and more dangerous installation procedure.

SUMMARY OF THE INVENTION

According to the present invention, an electronic circuit housing is provided for use with smoke and fire alarms, etc., wherein battery removal or replacement can be effected easily and safely. In particular, according to the invention, battery replacement can be effected without the user being required to juggle multiple components simultaneously or fumble with awkward battery receiving clips, etc.

In general, according to an aspect of the present invention there is provided a battery housing, comprising a main body portion, a socket in said main body portion shaped to receive a battery, contacts disposed at one end of said socket adapted to connect with correspondingly disposed electrodes on said battery, and a lid adapted to open and close over said socket, said lid including means for urging said battery electrodes into connection with said contacts.

BRIEF DESCRIPTION OF THE DRAWINGS

FIG. 3 is a cross-sectional view similar through the centre of the battery socket shown in FIGS. 1 and 2.

DETAILED DESCRIPTION OF THE PREFERRED EMBODIMENT

Figure 1:
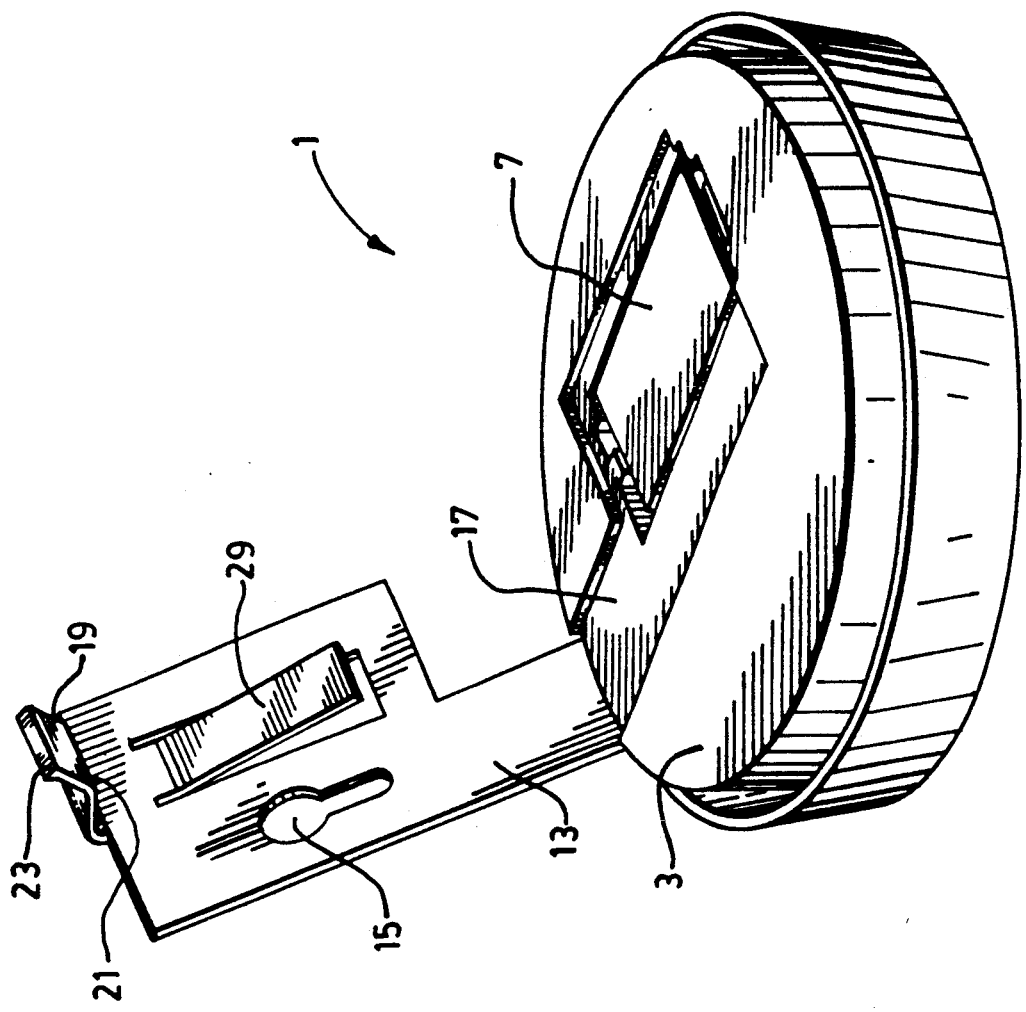
FIGS. 1 and 2 are perspective views showing the bottom of a battery housing according to the preferred embodiment with a lid for the battery socket shown in the open position.

Turning to the FIGURES, a battery housing 1 is shown comprising a main body portion 3, a rectangular socket 5 in the main body portion adapted to receive a battery 7. The main body portion 3 of the battery housing 1 may be used to accommodate smoke alarm circuitry, intrusion alarm circuitry, etc. Contacts 9 are disposed at one end of the socket 5 for connection with correspondingly disposed electrodes 11 on the battery 7. The socket 5 is dimensioned with rectangular slots for receiving the electrodes 11 of the battery. Moreover, the rectangular slots are differently sized so as to prevent insertion of the battery into socket 5 with reverse polarity.

A lid 13 is adapted to open and close over the socket 5. The lid is pivoted to the bottom surface of the main body portion 3, and includes an aperture 15 through which a screw or bolt may be inserted for securing the battery housing to the ceiling via the lid 13. The main body portion 3 is provided with a recessed area 17 conforming to the shape of the lid 13 such that, when the battery housing is installed on a ceiling and the lid is closed, the bottom surface of the battery housing will be flush with the ceiling surface.

The lid 13 includes a latch 19 adapted to be inserted into the socket 5 at an end thereof opposite the contacts 9. The latch 19 has an inward bend culminating in an apex 21 for forcing the battery 7 away from the latch 19 upon closing the lid 13, whereby the electrodes 11 are urged into close connection with the contacts 9. The latch 19 also includes a tooth or catch 23 adapted to be received within a cavity 25 of the socket 5 such that one face of the catch 23 engages with an adjacent surface 27 of cavity 25 thereby securing the lid 13 in closed position via latch 19. However, such closure may be effected only when the battery 7 is disposed within the socket 5. In particular, the battery 7 must be in place to provide pressure against the apex 21 for pushing the catch 23 into engagement with cavity 25. This feature is provided as a safety measure to provide a visual indication (i.e. the open lid 13) in the event of a missing battery.

Figure 3:
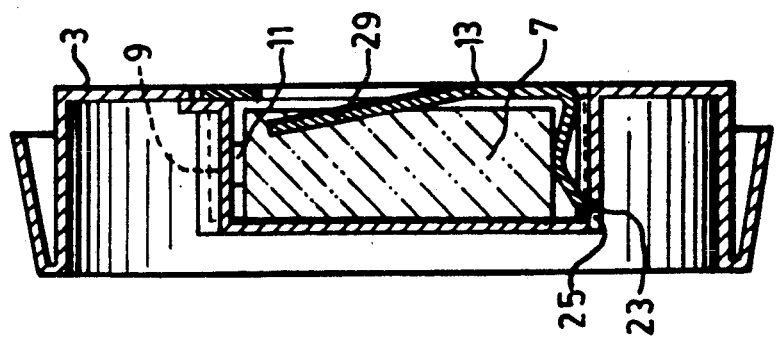
FIG. 3 is a plan view of the battery housing with the lid in the closed position.
Figure 2:
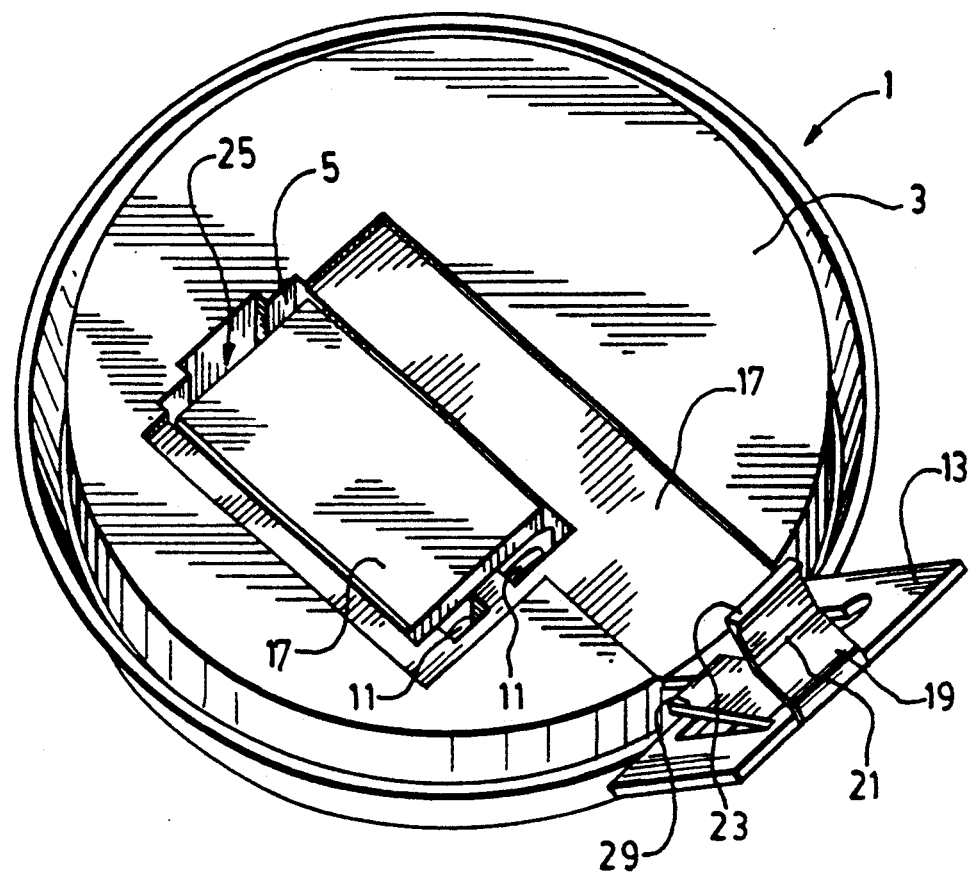

Lid 13 further comprises a resilient tab 29 projecting from the lid at an acute angle thereto for forcing the battery 7 into the socket 5 upon closing the lid 13 (shown best with reference to FIG. 3).

In normal operation, battery housing 1 is secured to a ceiling via a screw or bolt (not shown) passing through aperture 15 of lid 13. As discussed above, with the lid 13 in the closed position the bottom surface of the main body portion 3 is flush with the ceiling. The lid 13 remains in the closed position as a result of the tooth or catch 23 of latch 19 engaging surface 27 of cavity 25 in the socket 5. The resilient tab urges battery 7 into the socket 5, while the apex 21 of latch 19 urges the battery contacts 11 into close connection with the electrode contacts 9 of the battery housing while simultaneously urging the catch 23 into engagement with the cavity 25.

Battery replacement is accomplished by simply pulling downwardly on the main body portion 3 such that latch 19 disengages from cavity 25. Since the main body portion 3 is pivotally connected to lid 13, the main body portion 3 rotates downwardly under gravitational force. Furthermore, since battery 7 is no longer retained within socket 5 by means of resilient tab 29 and latch 19, when in the lid is rotated to the open position, battery 7 can be easily pulled out of the socket 5 or allowed to fall out under gravitational force. Similarly, a replacement battery can be inserted in socket 5 and held in place while the main body portion 3 is pivoted upwardly such that latch 19 re-engages the cavity 25 thereby forcing the replaced battery 7 into close contact with the electrode contacts 9.

As discussed above, the ease with which batteries may be installed, removed or replaced according to the present invention constitutes a significant improvement over prior art systems.

Furthermore, in the event that the circuitry within the battery housing 1 requires servicing, the entire unit may be easily replaced by simply unscrewing the single screw or bolt (not shown) which passes through aperture 15. According to prior art devices, in order to remove the battery housing from the ceiling a user is typically required to first remove the outer cover, pry loose the battery to avoid inadvertent alarm generation, and then remove multiple screws for freeing the circuitry from the ceiling.

Other embodiments and variations of the present invention are possible. For example, whereas the preferred embodiment discusses an application to fire or smoke alarm detection systems, the principles of the invention may be applied to virtually any battery-operated electronic device. Although the preferred embodiment illustrates a nine volt transistor-type battery, the principles of the invention may be applied to virtually any voltage and/or size of battery used to power electronic devices (e.g. AA, C, or D-type batteries, etc.). All such modifications are believed to be within the sphere and scope of the invention as defined by the claims appended hereto.

I claim:

1. A battery housing, comprising a main body portion, a socket in said main body portion shaped to receive a battery, contacts disposed at one end of said socket for connection to correspondingly disposed electrodes on said battery, and a lid positioned to open and close over said socket, said lid including means for urging said battery electrodes into connection with said contacts, said means for urging comprising a latch for insertion into said socket at an end thereof opposite said contacts, said latch having an inward bend for forcing said battery toward said opposite end upon closing said lid, whereby said electrodes are urged into close connection with said contacts, and further including a resilient tab projecting from said lid at an acute angle thereto for forcing said battery into said socket upon closing said lid.

2. The battery housing of claim 1 wherein said lid is pivotally connected to said main body portion.

3. The battery housing of claim 1 wherein said lid includes an aperture for mounting said housing to a screw.

4. The battery housing of claim 1 wherein said main body portion is dimensioned to contain smoke alarm circuitry.

5. The battery housing of claim 1 wherein said main body portion is indented to receive said lid in closed position such that said lid and main body portion form a flat surface.

6. The battery housing of claim 1 wherein said socket conforms generally to a rectangular parallelepiped in shape.

7. The battery housing of claim 1 wherein said socket includes a cavity for receiving said latch, said latch being urged into connection with said cavity due to said inward bend being displaced by said battery.

8. The battery housing of claim 7 wherein said latch includes a tooth portion extending from a distal end thereof.

9. The battery housing of claim 8 wherein said cavity is bounded on one side by a surface against which said tooth portion rests for securing said lid upon closure thereof.

10. The battery housing of claim 1 further including a pair of differently sized rectangular slots in said socket for aligning said electrodes of the battery with like polarity ones of said contacts.

11. A battery housing, comprising a main body portion, a socket in said main body portion shaped to receive a battery, contacts disposed at one end of said socket for connection to correspondingly disposed electrodes on said battery, and a lid positioned to open and close over said socket, said lid including means for urging said battery electrodes into connection with said contacts, said lid including an aperture for mounting said housing to a screw.

12. A battery housing, comprising a main body portion, a socket in said main body portion shaped to receive a battery, contacts disposed at one end of said socket for connection to correspondingly disposed electrodes on said battery, and a lid positioned to open and close over said socket, said lid including means for urging said battery electrodes into connection with said contacts, said means for urging comprising a latch adapted to be inserted into said socket at an end thereof opposite said contacts, said latch having an inward bend for forcing said battery toward said opposite end upon closing said lid, whereby said electrodes are urged into close connection with said contacts, said socket including a cavity for receiving said latch, said latch being urged into connection with said cavity due to said inward bend being displaced by said battery.

13. A battery housing, comprising a main body portion, a socket in said main body portion shaped to receive a battery, contacts disposed at one end of said socket for connection to correspondingly disposed electrodes on said battery, a lid positioned to open and close over said socket, said lid including means for urging said battery electrodes into connection with said contacts, and further including a pair of differently sized rectangular slots in said socket for aligning said electrodes of the battery with like polarity ones of said contacts.

* * * * *